United States Patent [19]

Merz

[11] Patent Number: 4,809,990

[45] Date of Patent: Mar. 7, 1989

[54] BRUSH SEALS OF CERAMIC MATERIAL FOR THERMAL TURBOMACHINES

[75] Inventor: Herbert Merz, Munich, Fed. Rep. of Germany

[73] Assignee: Motoren und Turbinen Union Munchen GmbH, Munchen, Fed. Rep. of Germany

[21] Appl. No.: 892,193

[22] Filed: Jul. 31, 1986

[30] Foreign Application Priority Data

Jul. 31, 1985 [DE] Fed. Rep. of Germany ....... 3527499
Feb. 27, 1986 [DE] Fed. Rep. of Germany ....... 3606283

[51] Int. Cl.$^4$ ..................... F16J 15/12; F16J 15/447
[52] U.S. Cl. ..................................... 277/53; 501/88; 501/90; 501/95; 501/133; 501/154; 501/127
[58] Field of Search ....................... 277/53; 501/88, 95, 501/90, 153, 154, 127

[56] References Cited

U.S. PATENT DOCUMENTS

| | | | |
|---|---|---|---|
| 2,878,048 | 3/1959 | Peterson | 228/2 |
| 3,917,150 | 11/1975 | Ferguson | 228/159 |
| 4,101,615 | 7/1978 | Horikiri | 264/63 |
| 4,342,712 | 8/1982 | Yajima | 264/63 |
| 4,399,232 | 8/1983 | Yajima | 501/38 |
| 4,600,202 | 7/1986 | Schaeffler | 277/53 |
| 4,679,619 | 7/1987 | Wohrl | 165/81 |

Primary Examiner—Mark L. Bell
Attorney, Agent, or Firm—Roberts, Spiecens & Cohen

[57] ABSTRACT

A brush seal for use in thermal turbomachines comprising bristles which consist of oxidic or non-oxidic ceramic fiber.

4 Claims, No Drawings

BRUSH SEALS OF CERAMIC MATERIAL FOR THERMAL TURBOMACHINES

RELATED APPLICATION

This application is related to Ser. No. 892,189 filed July 31, 1986 and now issued as U.S. Pat. No. 4,730,876 insofar that they share a common application for priority.

FIELD OF THE INVENTION

This invention relates to a brush seal for use in thermal turbomachines, more particularly for sealing the circumferential gaps in such machines.

PRIOR ART

Known in the art are brush seals for sealing circumferential gaps in which the seals include bristles made of wear-resistant organic material. Also known is the use of metallic bristles for brush seals, in which the metal bristles or wires are normally made of superalloys when used under thermal loads.

It has been found that brush-type seals of metallic bristles will not perform as well as anticipated in thermal turbomachines, especially due to the fact that at elevated temperatures, wire bristles will lose their resilience and partially bend out of shape. The brush seals were then made greatly oversized, but the high rotational speeds of turbomachines caused undesirably great run-in wear attended by correspondingly severe wear on the shaft bearings and the brush-type seals themselves.

SUMMARY OF THE INVENTION

It is an object of the present invention to provide a brush seal suitable for use in thermal turbomachines.

In accordance with the invention, the brush seal is constituted of bristles made of ceramic fiber.

The use of ceramic fibers for the bristles obviates the risk of plastic deformation, especially at elevated operating temperatures and thereby the resilience of the bristle will remain fully intact.

Another advantage of the use of ceramic fibers for the bristle material is the moderate coefficient of friction between ceramic materials and steel, and between ceramic materials and the conventional hard facings of turbomachine shafts.

Further advantages provided by the use of ceramic fibers for the bristles are its high resistance to abrasion and to the aggressive hot gases and oil vapors commonly present in a turbomachine environment.

DETAILED DESCRIPTION OF PREFERRED EMBODIMENTS

The invention will be described hereafter in respect of preferred embodiments thereof.

In accordance with the invention, the bristles of a brush seal for sealing the circumferential gaps in a thermal turbomachine consist of ceramic fibers. These fibers are resilient and retain their resiliency at temperatures up to 1000° C. Examples of the ceramic fibers will be given hereafter with reference to oxidic and non-oxidic ceramic material.

EXAMPLE I

In this example, the ceramic material consists of nonoxidic $Si_3N_4$.

EXAMPLE II

In this example, the ceramic material consists essentially of the following components, by weight.
$SiO_2$: 5–30%
C: 2–15%
SiC: balance to 100%.

EXAMPLE III

In this example, the ceramic material consists essentially of the following components, by weight.
$SiO_2$: 5–25%
C: 2–15%
$TiO_2$: 2–15%
SiC: balance to 100%.

EXAMPLE IV

In this example, the ceramic material consists of an oxidic ceramic material selected from the group consisting of $\alpha\text{-}Al_2O_3$, $\gamma\text{-}Al_2O_3$ and $SiO_2$.

Although the invention has been described in relation to specific embodiments of the invention, it will become apparent to those skilled in the art that numerous variations and modifications can be made within the spirit and scope of the invention as defined by the attached claims.

What is claimed is:

1. In a brush seal having bristles for sealing circumferential gaps in a thermal turbomachine, the improvement wherein the bristles of the brush seal consist of ceramic fiber consisting essentially of: non-oxidic $Si_3N_4$ or SiC-based ceramic material; or oxidic ceramic material selected from the group consisting of $\alpha\text{-}Al_2O_3$, $\delta\text{-}Al_2O_3$ and $SiO_2$.

2. The improvement as claimed in claim 1 wherein said ceramic material consists essentially of, by weight, 5 to 30% $SiO_2$, 2 to 15% C, and the remainder SiC.

3. The improvement as claimed in claim 1 wherein said ceramic material consists essentially of, by weight, 5 to 25% $SiO_2$, 2 to 15% C, 2 to 15% $TiO_2$ and the remainder SiC.

4. The improvement as claimed in claim 1 in which the ceramic fibers are resilient and retain their resiliency at temperatures up to 1000° C.

* * * * *